(12) United States Patent
Buelow et al.

(10) Patent No.: US 10,611,300 B2
(45) Date of Patent: Apr. 7, 2020

(54) VEHICLE INTERIOR LIGHT WITH LENS INTEGRAL TO LIGHTGUIDE

(71) Applicant: VOLKSWAGEN AKTIENGESELLSCHAFT, Wolfsburg (DE)

(72) Inventors: Stefan Buelow, Braunschweig (DE); Alexej Preobraschenski, Wolftsburg (DE); Klaus Zander, Hoetensleben (DE); Mirco Wenzel, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/946,288

(22) Filed: Apr. 5, 2018

(65) Prior Publication Data
US 2018/0290589 A1  Oct. 11, 2018

(30) Foreign Application Priority Data

Apr. 5, 2017  (DE) .......... 10 2017 205 789

(51) Int. Cl.
| | |
|---|---|
| *B60Q 3/00* | (2017.01) |
| *B60Q 3/82* | (2017.01) |
| *B60Q 3/62* | (2017.01) |
| *B60Q 3/74* | (2017.01) |
| *B60Q 3/225* | (2017.01) |
| *B60Q 3/14* | (2017.01) |
| *B60Q 3/64* | (2017.01) |

(52) U.S. Cl.
CPC ................ *B60Q 3/82* (2017.02); *B60Q 3/14* (2017.02); *B60Q 3/225* (2017.02); *B60Q 3/62* (2017.02); *B60Q 3/64* (2017.02); *B60Q 3/74* (2017.02); *B60Y 2304/05* (2013.01)

(58) Field of Classification Search
CPC ........ B60Q 3/82; B60Q 3/62–66; B60Q 3/14; B60Q 3/225
See application file for complete search history.

(56) References Cited

U.S. PATENT DOCUMENTS

| | | | |
|---|---|---|---|
| 7,342,485 B2 * | 3/2008 | Joehl ........................ | B60J 7/057 296/223 |
| 9,193,301 B2 | 11/2015 | Salter et al. | |
| 10,124,723 B2 * | 11/2018 | Letoumelin .............. | B60Q 3/82 |

(Continued)

FOREIGN PATENT DOCUMENTS

| | | |
|---|---|---|
| DE | 29723850 U1 | 4/1999 |
| DE | 10321964 A1 | 12/2004 |

(Continued)

*Primary Examiner* — Gerald J Sufleta, II
(74) *Attorney, Agent, or Firm* — Muncy, Geissler, Olds & Lowe, P.C.

(57) ABSTRACT

An interior light for a motor vehicle, having a switch for switching the interior light on and off, a lens and at least a first light of which the light beams pass through the lens and are able to provide a first light function. Furthermore, there is at least one second light of which the light beams can be coupled into at least one light guide via at least one light entry point, and can be coupled out again via at least one light extraction structure to provide a second light function. The lens can be an integral part of the light guide. In this way, an interior light for a motor vehicle can be realized, which has a switch indicator light and can be made of a very compact design.

10 Claims, 4 Drawing Sheets

(56) References Cited

U.S. PATENT DOCUMENTS

| | | | | |
|---|---|---|---|---|
| 2010/0157617 | A1* | 6/2010 | Schwab | B60Q 1/0408 362/511 |
| 2010/0207872 | A1* | 8/2010 | Chen | G06F 3/03547 345/156 |
| 2010/0309677 | A1* | 12/2010 | Kazaoka | B60Q 1/2665 362/519 |
| 2012/0257401 | A1 | 10/2012 | Wilfert | |
| 2014/0119043 | A1* | 5/2014 | Kodama | B60Q 3/20 362/551 |
| 2014/0286029 | A1* | 9/2014 | Mueller | B60Q 3/82 362/511 |
| 2014/0321139 | A1* | 10/2014 | Bungenstock | F21S 43/145 362/511 |
| 2014/0376253 | A1* | 12/2014 | Tahara | H03K 17/962 362/546 |
| 2015/0043193 | A1* | 2/2015 | Chiba | B29C 45/16 362/23.05 |
| 2015/0047958 | A1* | 2/2015 | Chiba | B29C 45/16 200/314 |
| 2015/0062942 | A1* | 3/2015 | Shiraishi | B60K 37/06 362/490 |
| 2015/0274070 | A1* | 10/2015 | Shiraishi | H05B 33/0803 315/77 |
| 2015/0298605 | A1* | 10/2015 | Salter | H05B 33/0872 315/77 |
| 2015/0360605 | A1* | 12/2015 | Lanser | B60Q 3/82 362/511 |
| 2015/0367773 | A1* | 12/2015 | Matsumaru | B60Q 1/2619 362/516 |
| 2017/0120808 | A1* | 5/2017 | Abe | H05B 37/0227 |
| 2018/0065547 | A1* | 3/2018 | Kirilenko | F16H 63/42 |
| 2018/0112847 | A1* | 4/2018 | Childress | F21S 41/24 |
| 2018/0217670 | A1* | 8/2018 | Cho | G06F 3/017 |

FOREIGN PATENT DOCUMENTS

| | | |
|---|---|---|
| DE | 10 2005 058 502 A1 | 6/2007 |
| DE | 10 2008 008 180 A1 | 8/2009 |
| DE | 10 2009 037 104 A1 | 2/2011 |
| DE | 20 2010 005 688 U1 | 9/2011 |
| DE | 10 2011 016 420 A1 | 10/2012 |
| DE | 10 2013 012 228 A1 | 1/2015 |
| DE | 10 2015 206 958 A1 | 10/2015 |
| DE | 10 2014 226 146 A1 | 6/2016 |
| EP | 0728617 A2 | 8/1996 |

* cited by examiner

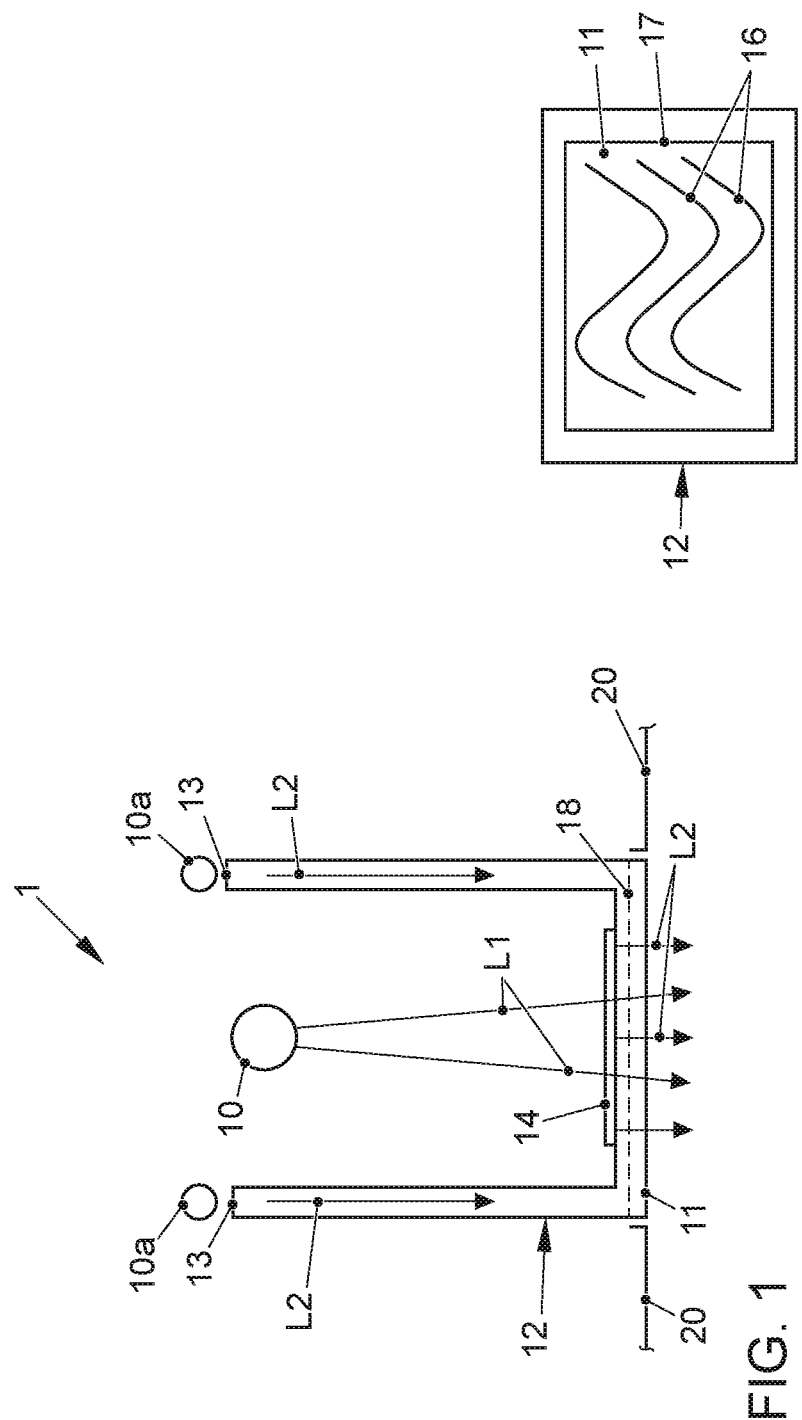
FIG. 1
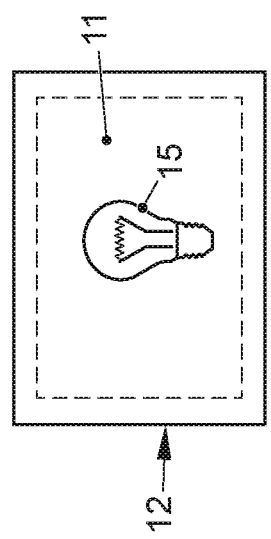
FIG. 2
FIG. 3

VEHICLE INTERIOR LIGHT WITH LENS INTEGRAL TO LIGHTGUIDE

This nonprovisional application claims priority under 35 U.S.C. § 119(a) to German Patent Application No. 10 2017 205 789.0, which was filed in Germany on Apr. 5, 2017, and which is herein incorporated by reference.

BACKGROUND OF THE INVENTION

Field of the Invention

The present invention relates to an interior light for a motor vehicle. The invention further relates to an overhead console comprising at least one such interior light, and a motor vehicle having at least one such overhead console or at least one such interior light.

Description of the Background Art

At present, in most vehicles, control switches on interior lights are illuminated to improve visibility in the dark and thus serve as an indicator light for the switch. However, as a result additional components must be used to turn the interior light on or off and to realize the switch indicator light of the control switch.

An interior light with the features of the preamble of claim 1 can be found in EP 0 728 617 A2. Specifically, the interior light described therein is part of an overhead console used in the roof lining of a vehicle. The overhead console has two lenses, behind each of which a first lighting means is arranged, the light of which passes through the lens and provides the light function of an interior light or a reading light. Between the lenses, a light guide is arranged on the back, into which the light from two other illuminants can be coupled. The light is used to illuminate control switches arranged between the lenses and is a switch indicator light.

In DE 10 2015 206 958 A1, which corresponds to U.S. Pat. No. 9,193,301, a vehicle reading lighting means having a low-intensity light setting is proposed. The vehicle reading lighting means is also part of an overhead console in the interior of a vehicle. In a dark vehicle environment detected by a light sensor, a control device causes a lighting means of the reading light to generate low intensity light of a first color. As an operators hand approaches the reading lighting means, the same lighting means is caused to emit high intensity light of a second color. To detect the approach of a user's hand, a proximity sensor is arranged behind the lens of the vehicle reading lighting means.

Finally, in DE 103 21 964 A1, which corresponds to U.S. Pat. No. 7,342,485, a reading light embedded in an overhead console of a vehicle is proposed, in which a vehicle occupant's hand approaching a functional surface of the reading light can be detected by a sensor. If this is detected, the reading light is switched on with low light intensity and can thus serve as a switch indicator light.

SUMMARY OF THE INVENTION

It is therefore an object of the present invention to provide an interior light for a motor vehicle, which can provide multiple light functions and which is nonetheless inexpensive to produce.

In an exemplary embodiment, the invention is based on an interior light for a motor vehicle with a switch for switching the interior light on and off. The interior light is provided with a lens and at least a first light. The light from the light can pass through the lens and provide a first light function. Furthermore, the interior light has at least a second light, the light of which can be coupled into at least one light guide via at least one light entry point, and can be coupled out again via at least one light extraction structure. As a result, a second light function can be provided. The lights can be designed as light emitting diodes (LEDs).

The lens can be an integral part of the light guide. The lens is thus materially connected to the light guide and forms at least a part thereof.

In this way, the lens realizes a kind of dual function, whereby it is possible to avoid using additional components and to reduce assembly costs. Overall, this leads to a significant reduction in cost.

According to an embodiment, the switch for switching the interior light on and off comprises the lens. This further development also contributes to a possible reduction in components, and thus cost.

If the switch for switching the interior light on and off also comprises the lens, it is advantageous if the lens is provided with a contactless and/or a proximity-sensitive sensor system. In this way it is possible to turn the interior light on and off in a simple manner by an operator's hand simply approaching the lens of the interior light or by a touch of said hand. It is also conceivable, however, to design the switch, that is, in this case the lens, differently, for example as a push button.

According to an embodiment of the invention, it is proposed that the first light function is a light for illuminating at least part of an interior of the motor vehicle and the second light function is an indicator light for the switch for switching the interior light on and off. In this way, easy operation of the interior light is guaranteed even in the dark. For example, the first light function may be a reading light which produces a narrow light spot. But it is also quite conceivable that by means of the first light function, a larger area of the interior is illuminated.

An embodiment of the invention proposes that the lens has at least one light extraction structure, which in a plan view of the interior light is framed counter to its light emission direction by a casing of the interior light. In this way, the second light function can be realized in an appealing manner. This is the case, in particular, when the second light function is an indicator light for the switch.

The lens can be embedded in the casing of the interior light such that the surface of the lens and that of the casing are approximately flush with each other and thus face the interior of the motor vehicle.

When the light extraction structure has a line-like contour corresponding to the contour of the lens, or at least approximately corresponding thereto, in a plan view of the interior light counter to its light emission direction, i.e., as seen from the interior, a particularly memorable and pleasing appearance of the second light function, in particular an indicator light, can be provided. The linear outline may, depending on the design of the lens, be quadrangular, round or oval. However, other outlines are also conceivable.

The extraction structure may expediently be additionally or alternatively designed in the manner of a symbol or a pictogram. This makes it easy to recognize which specific light function can be activated by the switch.

As mentioned, the invention also relates to an overhead console, which is provided with at least one interior light according to the invention. Such an overhead console can contribute to the ease of operation of the lighting device in the interior of a motor vehicle and also to a higher-quality ambiance.

According to an embodiment, the overhead console can have a plurality (i.e., at least two) of the interior lights according to the invention and several control switches. In this case, a main board is present, which carries a plurality of lights for illuminating the control switches, and a plurality of lights for coupling light into the lenses of the interior lights. In this case, starting from their surface facing the interior, the lenses each have at least one bend pointing to the main board. The end face of the bend forms a light entry point for the light of the light for coupling light into the lenses. In this way, the overhead console can be designed in a very compact manner and requires only a few boards for supplying power to the light.

Also, a motor vehicle has at least one overhead console according to the invention or at least one interior light according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is a sectional view of an interior light;

FIG. 2 is a view of the interior light according to FIG. 1 in a plan view of the lens;

FIG. 3 is a view comparable to FIG. 2, but with another embodiment of the interior light;

DETAILED DESCRIPTION

Figure 4:
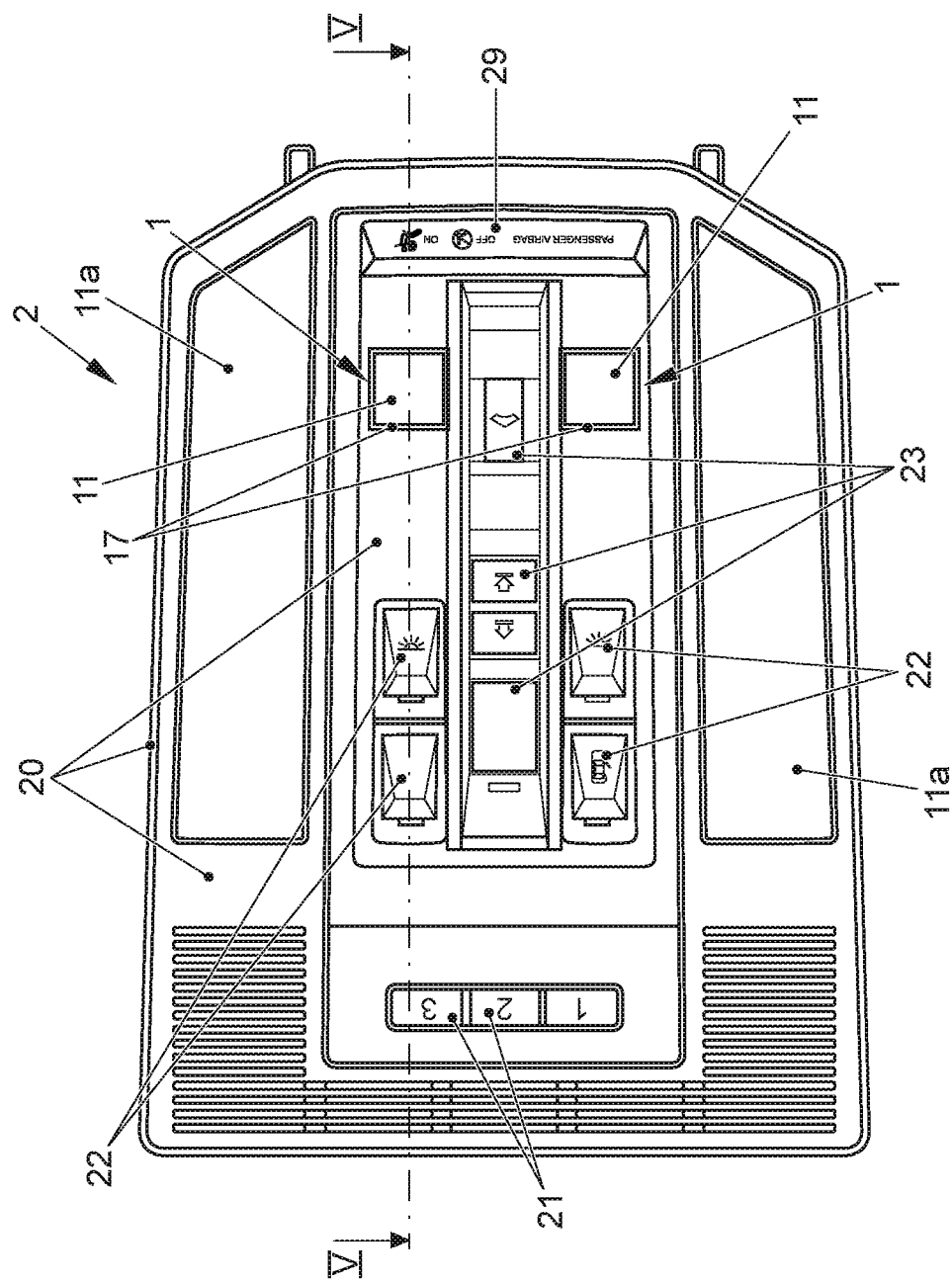
FIG. 4 is an overhead console with two interior lights according to the invention in a plan view of an imaginary interior.

FIG. 1 schematically shows an interior light 1 according to the invention in a longitudinal section. The interior light can, for example, be recessed in a casing 20 or covering. The interior light 1 has a cap-like light guide 12, into which light beams L2 of light 10a are coupled via two light entry points 13.

Due to total reflection, the light beams L2 are transmitted through the light guide 12 in the direction of a lens 11. The lens 11 is an integral part of the light guide 12. In other words, the lens 11 is materially connected to the light guide 12.

The light beams L2 coupled into the light guide 12 are decoupled via a suitable light extraction structure 14 and thus pass through the lens 11 in the direction of an interior of a motor vehicle, not shown in detail.

The light extraction structure 14 may preferably be introduced on the inside of the lens 11 or also on the outside of the lens 11 facing the interior.

It can also be seen that a further light 10 is arranged behind the lens 11. Light beams L1 of the light 10 pass through the lens 11, also in the direction of the interior.

The light 10 and the light beams L1 realize a first light function. The first light function may be, for example, a reading light. However, it is also conceivable that the light function is different, for example, the lighting of a storage compartment.

The light 10a and the light beams L2 realize a second light function. The second light function can be, for example, a switch indicator light, i.e., such lighting which is activated in the dark and makes the interior light 1 visible.

Depending on the configuration of the light extraction structure 14, additional information can be provided to the vehicle occupant.

Thus, FIGS. 2 and 3, which display the interior light 1 as viewed from the interior in a view of the lens 11, show that light extraction structures may be formed in the manner of a pictogram 15, a symbol 16 or a line-like outline 17. The line-like outline 17 may depend on the design of the lens 11 and, depending on the outline of the lens 11, may, for example, be square, round or oval.

Coming back to FIG. 1, a touch and/or proximity-sensitive surface 18 is further indicated by dashed lines. The surface 18 may for example be formed of a plurality of very small capacitive proximity sensors, which are arranged on or in the lens 11.

Thus, it is possible that the light 10 is switched on or off by a vehicle occupant's hand approaching or touching the lens 11.

A necessary electrical energy supply of the light 10a and 10 by the on-board voltage of a motor vehicle is not shown in detail for purposes of clarity.

It should also be mentioned that when activating the light 10, the lights 10a are deactivated or their decoupled light beams L2 are simply eclipsed by the light beams L1.

The lights 10 and 10a can be designed as light-emitting diodes (LEDs). However, they can also be designed as conventional filament lights.

FIG. 4 shows an overhead console 2 for mounting in a roof lining of a motor vehicle. The overhead console 2 has two elongated lenses 11a, which provide light from non-illustrated light of an interior light in the front part of the interior. Between the lenses 11a, a plurality of control switches 21, 22 and 23 is arranged. These control switches can be designed as push button or toggle switches and can be used, for example, to activate the front interior lighting, to operate a sunroof or to cancel an emergency call. A touch-sensitive control surface 29 is used to turn a passenger airbag on or off.

Further, two interior lights 1 according to the invention are arranged between the lenses 11a. These each have a lens 11 with a square outline, wherein the lens 11 is embedded with its surface approximately flush in the surface of a casing 20 or covering of the overhead console 2.

In the exemplary embodiment, each lens 11 is provided with a light extraction structure 17, which has a line-like, square outline. The light extraction structure 17 is not only framed by the casing 20, but the light extraction structure 17 corresponds to the outline of the lens 11 in a plan view of the interior light 1, counter to its light emission direction. In this plan view, the light extraction structure 17 thus adjoins the casing 20 on all sides. The light extraction structure 17 lights up in the dark and when the ignition is switched on, thus providing an extravagant, but not intrusive switch indicator light for the interior lights 1.

As mentioned above, at the same time, the lenses 11 serve as switch for switching the interior lights 1 on and off and comprise an integrated touch or proximity sensor system.

Figure 5:
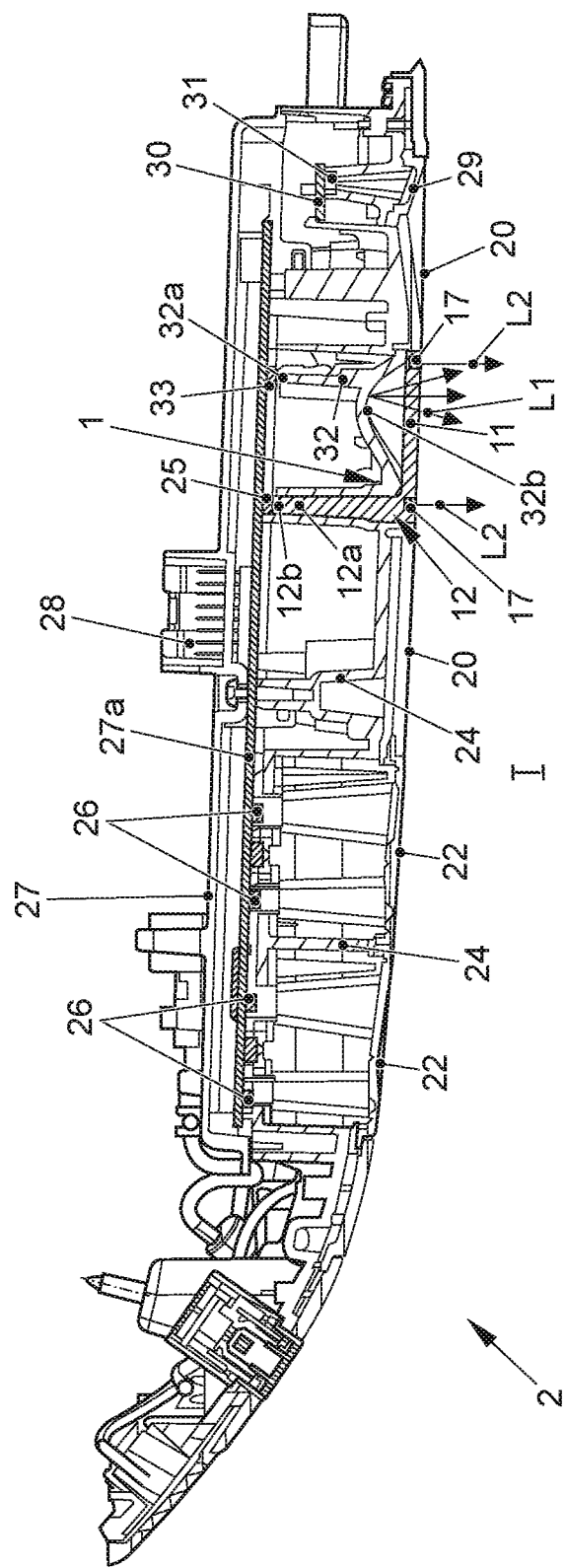
FIG. 5 is a longitudinal section through the overhead console according to view V of FIG. 4.

FIG. 5 shows a longitudinal section through the overhead console 2. It is apparent that the overhead console 2 has a support structure 24, which is covered by the casing 20 at the bottom towards an imaginary interior I.

At the top, the support structure 24 is covered by a cover 27, which also has a housing for a connector 28.

Under the cover 27, a main board 27a is arranged, which is electrically connected to the connector 28 and which carries a plurality of lights 25 and 26. The lights 26 are used in the embodiment for illuminating the control switches 22. The light 25 is used for coupling in light beams L2 into a light guide 12 via a light entry point 12b. Specifically, it can be seen that the lens 11 has an approximately right-angled bend 12a, which is guided up to the main board 27a or the light 25 with the light entry point 12b. The light conducted from the light entry points 12b to the lens 11 is coupled out through the line-like light extraction structure 17 into the interior I (light beams L2).

Below the lens 11 and within the light guide 12, a further light guide 32 is present, into which light beams L1 of a light 33 are coupled via a light entry point 32a. The light beams L1 are coupled out at a trough-like light exit region 32 and thus reach the interior I. A small, separate circuit board 30 carries a light 31, which serves to illuminate the touch-sensitive control surface 29.

All lights 25, 26 as well as 31 and 33 can be embodied as, for example, LEDs.

Figure 6:
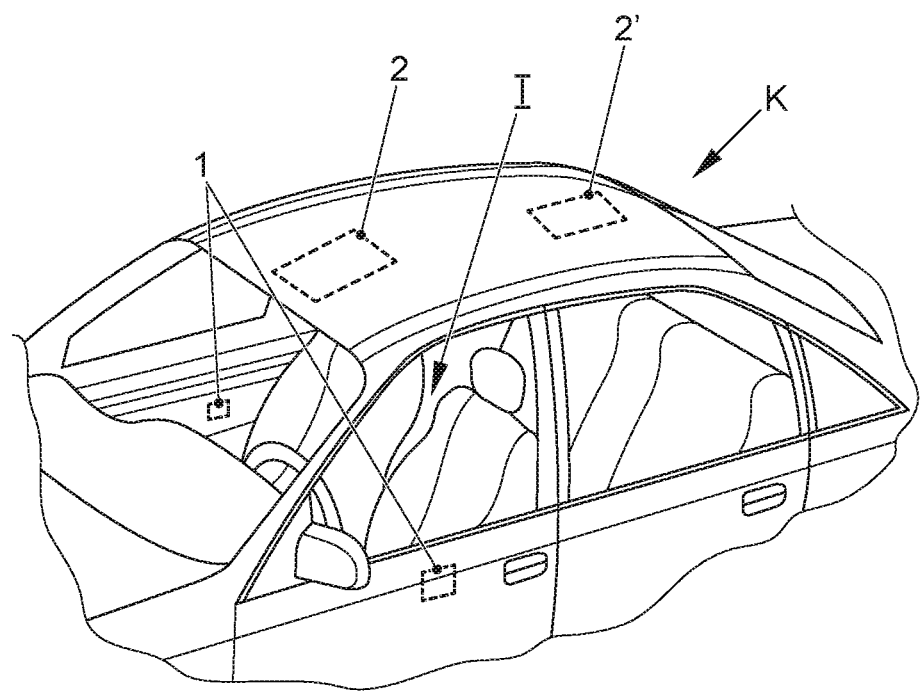
FIG. 6 is a motor vehicle with interior lights and overhead consoles according to the invention.

FIG. 6 shows a motor vehicle K, which is equipped with interior lights 1 according to the invention on the front vehicle doors, and with overhead consoles 2, 2' according to the invention in the front area and in the rear of the motor vehicle K.

The interior lights 1 each serve to illuminate a storage compartment, not shown, while the overhead consoles 2, 2' serve in the manner described for operating the interior light and the reading lights.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An interior light for a motor vehicle, the interior light comprising:
a switch for switching the interior light on and off, the switch being a lens;
at least one first light, light beams of which pass through the lens and provide a first light function; and
at least one second light, light beams of which are adapted to be coupled into at least one light guide via at least one light entry point, and which are adapted to be decoupled via at least one light extraction structure to pass through the lens for providing a second light function, the at least one light extraction structure being provided on the lens,
wherein the lens is an integral part of the light guide,
wherein the first light function is a light for illuminating at least part of an interior of the motor vehicle, the at least one first light that provides the first light function being turned on and off by the switch, and
wherein the second light function provided by the at least one second light is an indicator light that, by virtue of a displayed light pattern provided by the at least one light extraction structure, indicates to an occupant of the motor vehicle that the lens is the switch to turn on and off the first light function, such that the at least one second light stays on when the at least one first light is off to provide the indicator light.

2. The interior light according to claim 1, wherein the lens is provided with a touch-sensitive and/or proximity-sensitive sensor system.

3. The interior light according to claim 1, wherein the lens comprises the at least one light extraction structure, which in a plan view of the interior light, is framed counter to a light emission direction by a casing of the interior light.

4. The interior light according to claim 3, wherein, in the plan view of the interior light, the at least one light extraction structure has a line contour counter to the light emission direction, the line contour corresponding to an outline of the lens.

5. The interior light according to claim 4, wherein the at least one light extraction structure is additionally or alternatively formed as a symbol or a pictogram.

6. An overhead console comprising at least one interior light according to claim 1.

7. The overhead console according to claim 6, further comprising a plurality of interior lights and a plurality of control switches, wherein a main board carries a plurality of lights for an illumination of the control switches and a plurality of lights for coupling light beams into light guides, which at least partially form lenses of the interior lights, wherein the lenses, starting from a surface facing an imaginary interior, each have at least a bend pointing towards the main board, said bend being guided up to the light with an end face for coupling light beams into the light guide.

8. A motor vehicle comprising at least one overhead console according to claim 6.

9. The interior light according to claim 1, wherein when the at least one first light is turned on, the light beams of the at least one first light eclipse the light beams of the at least one second light.

10. The interior light according to claim 4, wherein the line contour comprises curved lines, straight lines or both.

* * * * *